United States Patent [19]
Nagano

[11] Patent Number: 6,128,973
[45] Date of Patent: Oct. 10, 2000

[54] BICYCLE PEDAL SYSTEM HAVING VARIABLE TREAD SURFACES

[75] Inventor: Masashi Nagano, Izumi, Japan

[73] Assignee: Shimano, Inc., Osaka, Japan

[21] Appl. No.: 09/017,994

[22] Filed: Feb. 3, 1998

Related U.S. Application Data

[62] Division of application No. 08/517,199, Aug. 21, 1995, Pat. No. 5,806,379, which is a continuation of application No. 08/123,884, Sep. 7, 1993, abandoned, which is a continuation of application No. 07/886,095, May 21, 1992, abandoned.

[30] Foreign Application Priority Data

May 30, 1991 [JP] Japan ................... 3-127077
Jun. 19, 1991 [JP] Japan ................... 3-147018

[51] Int. Cl.⁷ .................. G05G 1/14; F16D 1/00
[52] U.S. Cl. .............. 74/594.6; 74/594.4; 403/24; D12/125
[58] Field of Search ............. 74/594.4, 594.6; 403/24; D12/125

[56] References Cited

U.S. PATENT DOCUMENTS

| | | | |
|---|---|---|---|
| D. 27,920 | 11/1897 | Basch | D12/125 |
| D. 262,873 | 2/1982 | Okajima | D12/125 |
| D. 286,993 | 12/1986 | Kotamaki | D12/125 |
| 553,797 | 1/1896 | Wall | 74/594.4 |
| 622,034 | 3/1899 | Barnes . | |
| 679,043 | 7/1901 | Wirtz | 74/594.4 |
| 973,065 | 10/1910 | Pawsat et al. . | |
| 2,751,797 | 6/1956 | Pearl | 74/594.4 |
| 3,964,343 | 6/1976 | Lauterbach | 74/594.6 |
| 4,089,236 | 5/1978 | Genzling | 74/594.4 |
| 4,599,915 | 7/1986 | Hlavac et al. | 74/594.4 |
| 4,622,863 | 11/1986 | Denker | 74/594.6 |
| 4,836,047 | 6/1989 | Alcamo | 74/594.6 |
| 4,864,887 | 9/1989 | Rapisarda | 74/534.6 |
| 4,893,420 | 1/1990 | Bezin | 36/131 |
| 4,942,778 | 7/1990 | Bryne | 74/594.6 |
| 5,003,841 | 4/1991 | Nagano | 74/594.4 |
| 5,014,571 | 5/1991 | Dapezi | 74/594.6 |
| 5,284,066 | 2/1994 | Weiss | 74/594.6 |
| 5,381,708 | 1/1995 | Liao | 74/594.6 |
| 5,398,570 | 3/1995 | Chae | 74/563 |

FOREIGN PATENT DOCUMENTS

| | | | |
|---|---|---|---|
| 0 428 140 A1 | 5/1991 | European Pat. Off. | B62M 3/08 |
| 0619219 A1 | 10/1994 | European Pat. Off. | 74/594.6 |
| 3414971 A1 | 10/1985 | Germany | B62M 3/10 |
| 3424759 A1 | 1/1986 | Germany | B62M 3/10 |
| 3728015 A1 | 3/1989 | Germany | B62M 3/08 |
| 77 | 1/1884 | United Kingdom . | |
| WO 88/04802 | 6/1988 | WIPO | G05G 1/14 |
| WO 89/02625 | 3/1989 | WIPO | G05G 1/14 |

*Primary Examiner*—Vinh T. Luong
*Attorney, Agent, or Firm*—James A. Deland

[57] ABSTRACT

A bicycle pedal system with adaptable pedal thread surfaces includes a pedal (3) having a first tread surface (4) and an adapter (5) attachable to the first tread surface. The adapter defines a second tread surface (7) opposite to a surface thereof facing the first tread surface when the adapter is attached to the first tread surface. The first and second tread surfaces provide different use modes. The first tread surface (4) includes a cleat engaging device (4a) for engaging a cleat, and the second tread surface (7) defines an antislip device (16) suited to treading by a shoe. In an alternative pedal system, the first tread surface (14) defines an antislip device (16) suited to treading by a shoe, and the second tread surface (19) includes a cleat engaging device (20, 21).

20 Claims, 4 Drawing Sheets

6,128,973

BICYCLE PEDAL SYSTEM HAVING VARIABLE TREAD SURFACES

CROSS REFERENCE TO RELATED APPLICATIONS

This application is a division of application Ser. No. 08/517,199, filed Aug. 21, 1995, now U.S. Pat. No. 5,806,379 issued on Sep. 15, 1998, which is a continuation of application Ser. No. 08/123,884, filed Sep. 7, 1993, now abandoned, which is a continuation of application Ser. No. 07/886,095, filed May 21, 1992, now abandoned.

BACKGROUND OF THE INVENTION

1. Field of the Invention

The present invention relates to a bicycle pedal system having tread surfaces adaptable to cleat shoes and ordinary shoes.

2. Description of the Related Art

Conventionally, when the cyclist wears shoes with cleats attached thereto for pedaling a bicycle, pedals having tread surfaces with cleat engaging devices are attached to the crankset. When the cyclist wears ordinary shoes without cleats for pedaling the bicycle, pedals having antislip devices instead of the cleat engaging devices are attached to the crankset since ordinary shoes tend to slip on the pedals for engaging cleats.

Thus, depending on the types of shoes worn by the cyclist, the different types of pedals are selectively used.

Where the above two types of shoes are selectively worn, it is necessary to have the two types of pedals available and to attach an appropriate type of pedals to the crankset. This forces a waste of time and money on the cyclist.

SUMMARY OF THE INVENTION

The object of the present invention is to provide a novel pedal system for allowing the cyclist to use cleat shoes and ordinary shoes selectively without wasting time and money.

The above object is fulfilled, according to the present invention, by a bicycle pedal system with adaptable pedal tread surfaces comprising a pedal having a first tread surface, and an adapter attachable to the first tread surface, the adapter defining a second tread surface opposite to a surface thereof facing the first tread surface when the adapter is attached to the first tread surface, the first and second tread surfaces providing different use modes.

The first tread surface may include a cleat engaging device for engaging a cleat, while the second tread surface may define an antislip device suited to treading by a shoe. Conversely, the first tread surface may define an antislip device suited to treading by a shoe, while the second tread surface may include a cleat engaging device.

As noted above, an adapter for ordinary shoes is provided for the cleat shoe pedal. Conversely, an adapter for cleat shoes is provided for the ordinary shoe pedal. This simple provision allows the cyclist to select the tread surface formed on the pedal or the tread surface formed on the adapter according to the type of shoes the cyclist wears. Thus, tread surfaces suited to the different types of shoes are made available to the cyclist. When the cyclist wears cleat shoes, he or she may pedal the bicycle with the shoes fixed to the pedals by means of the cleat engaging devices provided as integral part of the pedals or formed on the pedals by using the adapters. When the cyclist wears ordinary shoes, he or she may pedal the bicycle with the shoes placed on the pedals and prevented from slipping thereon by the antislip devices provided as integral part of the pedals or formed on the pedals by using the adapters. In the latter instance, the cyclist can freely remove his or her feet from the pedal when necessary.

The present invention provides one type of pedal, i.e. the cleat shoe pedal or ordinary shoe pedal, and one adapter for this pedal. Whichever of the cleat shoe or ordinary shoe is selected, the cyclist can obtain a tread surface suited to the shoe. This is more economical than where the two types of pedals are provided.

Moreover, the adapter may be detachably secured to the pedal through a simple mounting structure compared with the case of interchanging pedals. The pedal specification may be altered relatively easily to accommodate change of shoes used.

Other features and advantages of the present invention will be apparent from the description of the preferred embodiments to be had with reference to the drawings.

DETAILED DESCRIPTION OF THE PREFERRED EMBODIMENTS

Figure 1:
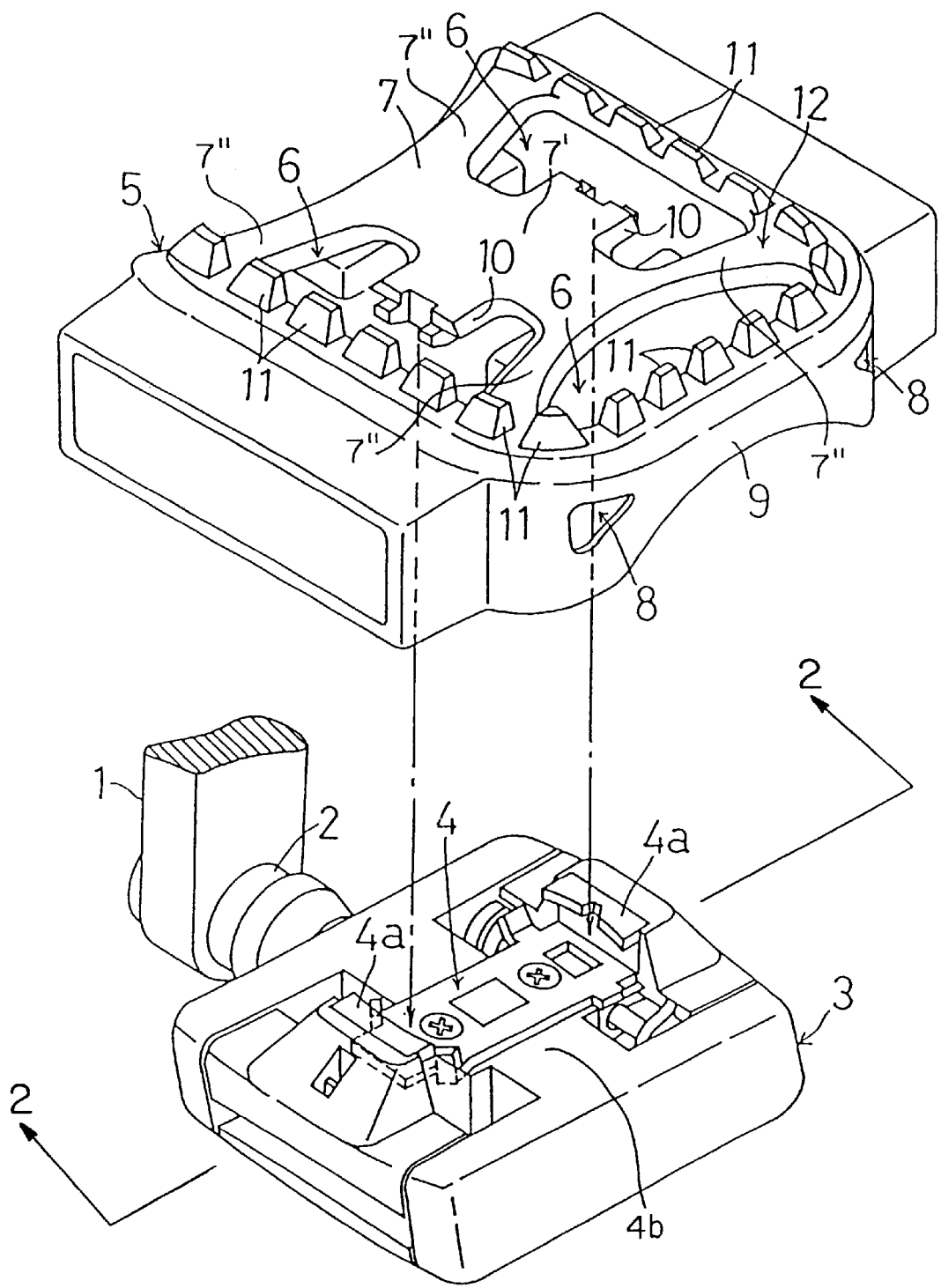
FIG. 1 is a perspective view showing a relationship between a pedal for a cleat shoe used in a pedal system according to the present invention and an adapter attachable to the pedal.

FIG. 1 shows a pedal for a cleat shoe used in a pedal system according to the present invention and an adapter attachable to the pedal. As shown, a bicycle crank arm 1 rotatably supports a pedal body 3 through a pedal shaft 2. The pedal body 3 has opposite tread surfaces. Each tread surface includes a cleat coupling device 4 having a pair of cleat engaging metal hooks 4a disposed in a forward region and a rearward region thereof. Each of the two hooks 4a is pivotable between a lock position and a release position and biased to the lock position by a lock spring (not shown). This construction allows the cyclist to ride the bicycle with each shoe fixed to the pedal through a cleat. As is well known, the shoe is fixed to the pedal by depressing the cleat, and released from the pedal by displacing the cleat relative to the pedal.

Figure 2:
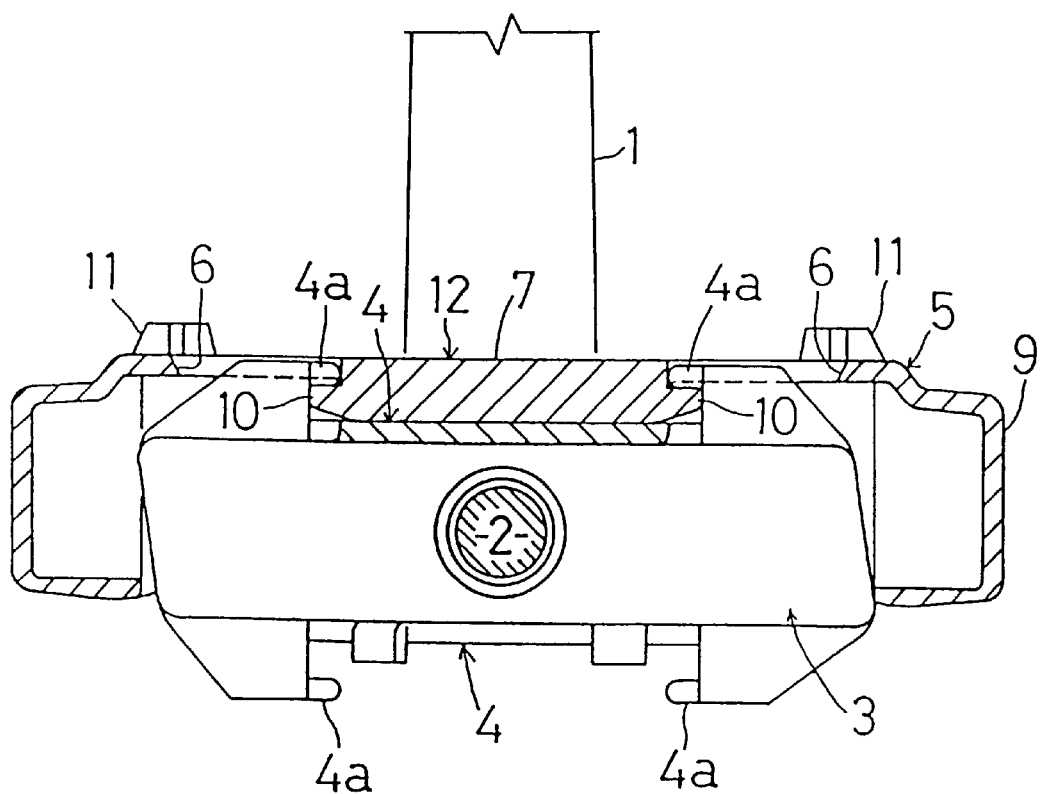
FIG. 2 is a sectional view taken along line 2—2 of the adapter mounted on the pedal shown in FIG. 1.

As shown in FIGS. 1 and 2, the cleat engaging hooks 4a may be used as an adapter coupling device for detachably securing an adapter 5 to the tread surface 4b of the pedal. This adapter 5 includes a tread surface suited to an ordinary shoe as described later. With the adapter 5 mounted in position, the pedal is converted to a pedal suitable to an ordinary shoe without a cleat and capable of preventing slips of the shoe.

As shown in FIG. 1, the adapter 5 has a main adapter body formed of plastics or metal as shown in FIG. 2 and including an upper plate portion 7 defining by an H-shaped bridge member a plurality of perforations 6, and a skirt portion 9 defining a plurality of perforations 8. The upper plate portion 7 includes a pair of couplings 10 formed centrally thereof for connection to the cleat engaging hooks 4a, and a multiplicity of projections 11 arranged peripherally of the upper plate portion 7. The upper plate portion 7 also includes connecting portions 7" between the bridge member 7' and the outer surface 12.

As shown in FIG. 2, the adapter body is formed as a case for covering one of the tread surfaces of the pedal body 3. When the adapter body is placed on the pedal body 3, the couplings 10 in their approach to the cleat engaging hooks 4a cause the hooks 4a to pivot in releasing directions. Subsequently, the lock springs (not shown) cause the hooks 4a to return to the lock positions for engaging the couplings 10, respectively. The entire adapter is thereby secured to the pedal body 3 not to be readily releasable. With the skirt portion 9 surrounding and contacting sides of the pedal body 3, the adapter 5 is not movable relative to the pedal body 3 along the tread surface. Once the adapter 5 is mounted on the pedal, an outer surface 12 of the upper plate portion 7 acts as a shoe receiving tread surface lying above the cleat coupling device 4 on the tread surface of the pedal on which the adapter 5 is mounted. In this state, the projections 11 of the outer surface 12 act as an antislip device.

The entire adapter 5 is releasable from the pedal by disengaging the couplings 10 of the adapter body from the cleat engaging hooks 4a through movement similar to the well known operation to release the cleat from the pedal.

Figure 3:
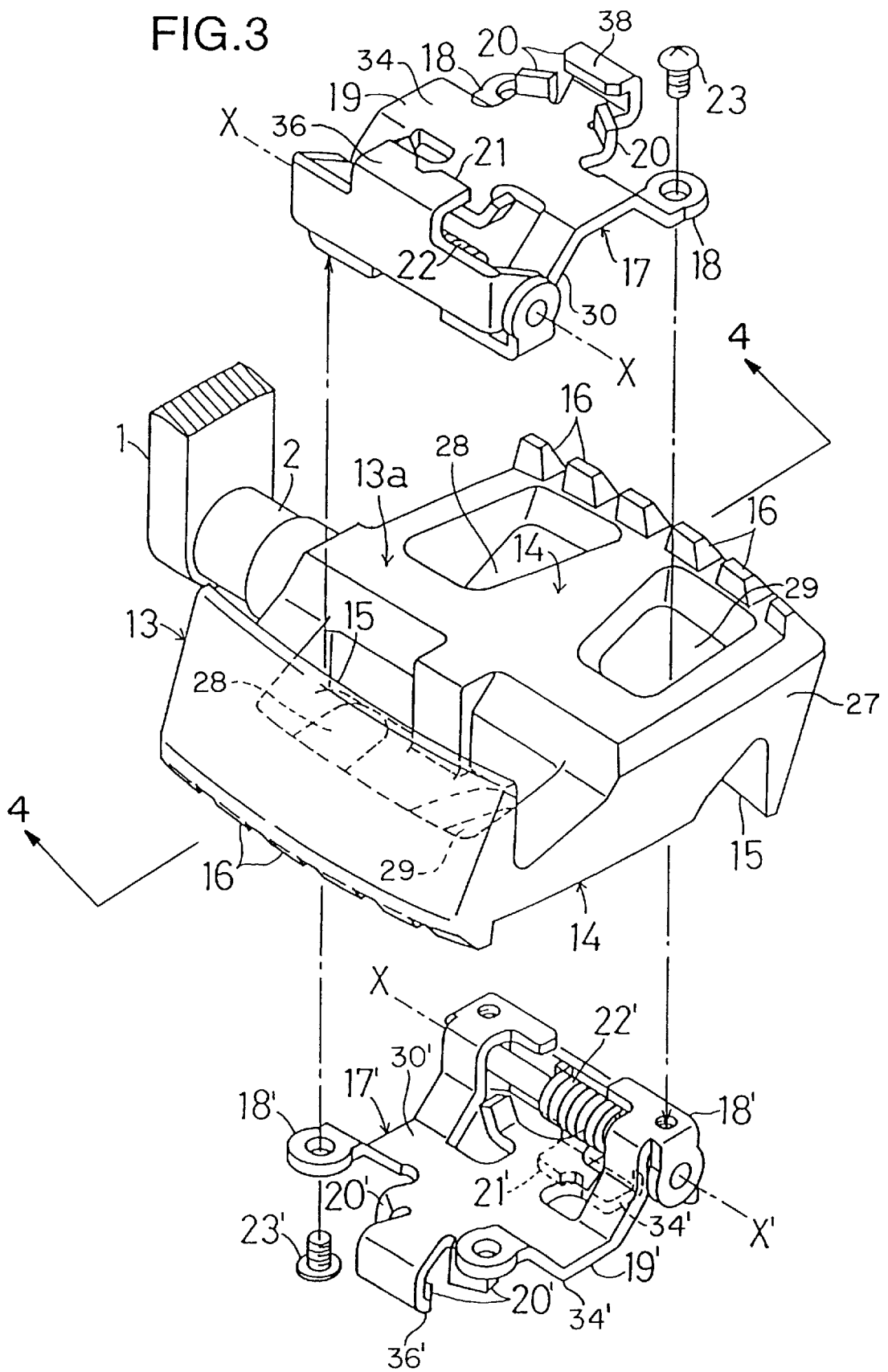
FIG. 3 is a perspective view showing a relationship between a pedal for an ordinary shoe used in the pedal system according to the present invention and an adapter attachable to this pedal.

FIG. 3 shows a pedal for an ordinary shoe used in a pedal system according to the present invention and an adapter attachable to this pedal. As shown, a bicycle crank arm 1 rotatably supports a pedal body 13 having a lateral perimeter 27 through a pedal shaft 2. The pedal body 13 has opposite tread surfaces 14, 14' defining openings 28 and 29 on opposite sides of pedal shaft 2. Each tread surface 14 includes an antislip ridge 15, 15' and antislip projections 16, 16' defined on a pedal frame. This construction allows the cyclist to pedal the bicycle with each ordinary shoe without a cleat placed on the tread surface 14, 14' free from slips.

Figure 4:
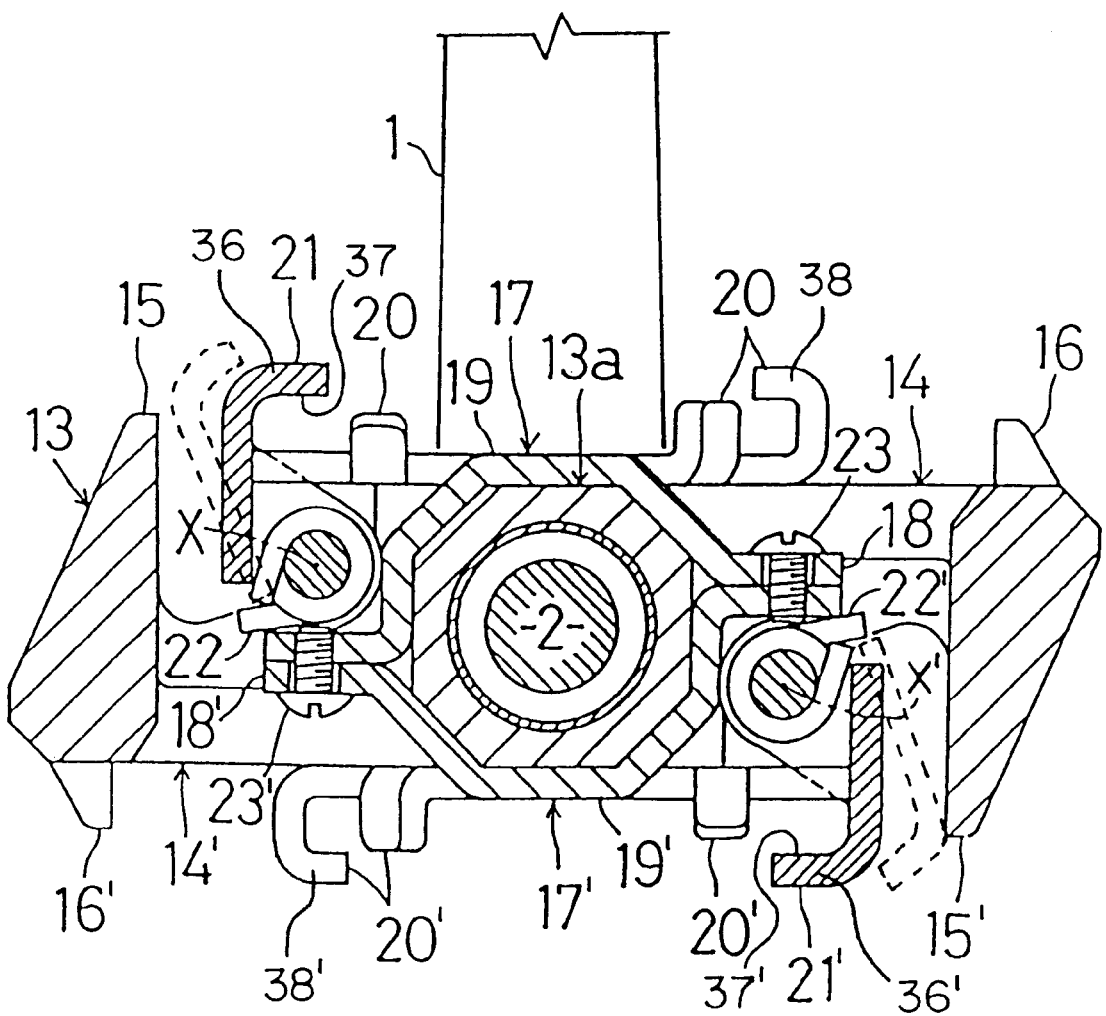
FIG. 4 is a sectional view of the adapter take along line 4—4 in FIG. 3.

As shown in FIG. 4, the pedal body 13 has a shaft connecting portion 13a available for use as an adapter mount for detachably securing an adapter 17, 17' to the pedal body 13. The adapter 17, 17' defines cleat receiving tread surfaces as described later. With the adapter 17, 17' mounted in position, the pedal is converted to a pedal suitable for securing a shoe with a cleat.

As shown in FIG. 3, the adapters 17, 17' have main adapter bodies 19, 19' formed of sheet metal and each including a pair of couplings 18. Each adapter body 19, 19' includes a first surface 30, 30' for facing its corresponding pedal tread surface 14, 14' and an opposite second surface 34, 34' for facing away from its corresponding pedal tread surface 14, 14'. Each adapter body 19, 19' further includes a fixed engaging claw 20, 20' and a movable engaging claw 21, 21'. Movable engaging claw 21, 21' may be considered a first cleat engaging claw, and fixed engaging claw 20, 20' may be considered a second cleat engaging claw, wherein both movable engaging claw 21, 21' and fixed engaging claw 20, 20' extend from its corresponding first surface 30, 30' essentially parallel to each other in a direction away from its corresponding second surface 34, 34'. Movable engaging claw 21, 21' includes a first upper portion 36, 36', and fixed engaging claw 20, 20' includes a second upper portion 38, 38', wherein first upper portion 36, 36' extends toward its corresponding second upper portion 38, 38' as shown more clearly in FIG. 4 and includes a cleat engaging surface 37, 37' facing in a direction toward first surface 30, 30' and second surface 34, 34'. Each claw 21, 21' is pivotable about an axis X, X' between a lock position and a release position (shown by broken lines in FIG. 4) and biased to the lock position by a spring 22, 22'.

As shown in FIG. 4, the couplings 18, 18' of the adapter body 19, 19' placed on the corresponding tread surfaces 14,14' of the pedal body 13 are rigidly connected by mounting screws 23, 23' to the couplings 18, 18' of the adapter body 19, 19' placed on the other tread surface 14, 14'. Thus, the couplings 18, 18' of the two adapter bodies 19, 19' immovably fix the adapters 17, 17' to the pedal body 13, with the shaft connecting portion 13a of the pedal body 13 sandwiched in between. Also, adapter bodies 19, 19' are completely surrounded by the lateral perimeter 27 of pedal body 13.

Once the adapter 17, 17' is mounted on the pedal, each pair of fixed cleat engaging claw 20, 20' and movable cleat engaging claw 21, 21' are opposed to one another across the tread surface 14, 14'.

The adapter 17, 17' is detachable from the pedal by removing the mounting screws 23, 23' to disconnect the adapter bodies 19, 19'.

In each of the foregoing embodiments, the cleat coupling device or the shaft connecting portion is used also as an adapter mount for allowing attachment of the adapter to the pedal body. This attaching structure or connecting mode is of course variable. For example, the adapter may be screwed to a mounting seat.

What is claimed is:

1. An adapter to convert a bicycle pedal having a tread surface for supporting a non-cleat shoe to a bicycle pedal for a cleat shoe, the adapter comprising:

a plate member having a first surface for facing the pedal and an opposite second surface for facing away from the pedal;

a cleat engaging device supported to the plate member for engaging a cleat, wherein the cleat engaging device includes a first cleat engaging claw pivotably coupled to the plate member and extending from the second surface in a direction opposite the first surface;

wherein the first cleat engaging claw has a cleat engaging surface facing in a direction toward the first surface and the second surface; and a coupling for retaining the plate member to the pedal.

2. The adapter according to claim 1 wherein the first cleat engaging claw pivots around a pivot axis between a lock position and a release position.

3. The adapter according to claim 2 wherein the plate member has a concave shape between the first cleat engaging claw and the second cleat engaging claw when viewed in a direction of the pivot axis.

4. The adapter according to claim 2 further comprising a spring for biasing the first cleat engaging claw towards the lock position.

5. An adapter to convert a bicycle pedal having a tread surface for supporting a non-cleat shoe to a bicycle pedal for a cleat shoe, the adapter comprising:

a plate member having a first surface for facing the pedal and an opposite second surface for facing away from the pedal;

a cleat engaging device supported to the plate member for engaging a cleat wherein the cleat engaging device includes a first cleat engaging claw pivotably coupled to the plate member and extending from the second surface in a direction opposite the first surface; and a coupling for retaining the plate member to the pedal;

wherein the cleat engaging device includes a second cleat engaging claw coupled to the plate member and extending from the second surface in a direction opposite the first surface.

6. The adapter according to claim 5 wherein the first cleat engaging claw extends parallel to the second cleat engaging claw.

7. The adapter according to claim 6 wherein the first cleat engaging claw includes a first upper portion, wherein the second cleat engaging claw includes a second upper portion, and wherein the first upper portion extends toward the second upper portion.

8. An adapter to convert a bicycle pedal having a tread surface for supporting a non-cleat shoe to a bicycle pedal for a cleat shoe, the adapter comprising:

a first adapter body and a second adapter body, each adapter body including:
   a plate member having a first surface for facing the pedal and an opposite second surface for facing away from the pedal;
   a cleat engaging device supported to the plate member for engaging a cleat, wherein the cleat engaging device includes a first cleat engaging claw pivotably coupled to the plate member and extending from the second surface in a direction opposite the first surface; and
   a coupling for coupling the first adapter body to the second adapter body.

9. The adapter according to claim 8 wherein the coupling of the first adapter body contacts the coupling of the second adapter body.

10. The adapter according to claim 8 further comprising a mounting member for mounting the coupling of the first adapter body to the coupling of the second adapter body.

11. The adapter according to claim 10 wherein the mounting member extends through the coupling of the first adapter body and into the coupling of the second adapter body.

12. The adapter according to claim 11 wherein the coupling of the first adapter body contacts the coupling of the second adapter body.

13. The adapter according to claim 12 wherein the mounting member includes a mounting screw that extends through the coupling of the first adapter body and into the coupling of the second adapter body.

14. The adapter according to claim 8 wherein the cleat engaging device of each adapter body includes a second cleat engaging claw coupled to the plate member and extending from the second surface in a direction opposite the first surface.

15. The adapter according to claim 14 wherein the first cleat engaging claw in each adapter body extends parallel to the second cleat engaging claw.

16. The adapter according to claim 15 wherein, in each adapter body, the first cleat engaging claw includes a first upper portion and the second cleat engaging claw includes a second upper portion, and wherein the first upper portion extends toward the second upper portion.

17. The adapter according to claim 8 wherein, in each adapter body, the first cleat engaging claw pivots around a pivot axis between a lock position and a release position.

18. The adapter according to claim 17 wherein, in each adapter body, the plate member has a concave shape between the first cleat engaging claw and the second cleat engaging claw when viewed in a direction of the pivot axis.

19. The adapter according to claim 18 wherein the coupling of the first adapter body contacts the coupling of the second adapter body so that the adapter has an annular shape when viewed in a direction of the pivot axis of each first cleat engaging claw.

20. The adapter according to claim 19 further comprising, in each adapter body, a spring for biasing the first cleat engaging claw towards the lock position.

* * * * *